Dec. 16, 1969            R. L. WILLIAMS            3,484,363
ELECTRICAL DISCHARGE TREATING APPARATUS DESIGNED TO PROVIDE
A PLURALITY OF UNIFORM SPARK DISCHARGES
Filed Nov. 14, 1966            2 Sheets-Sheet 1
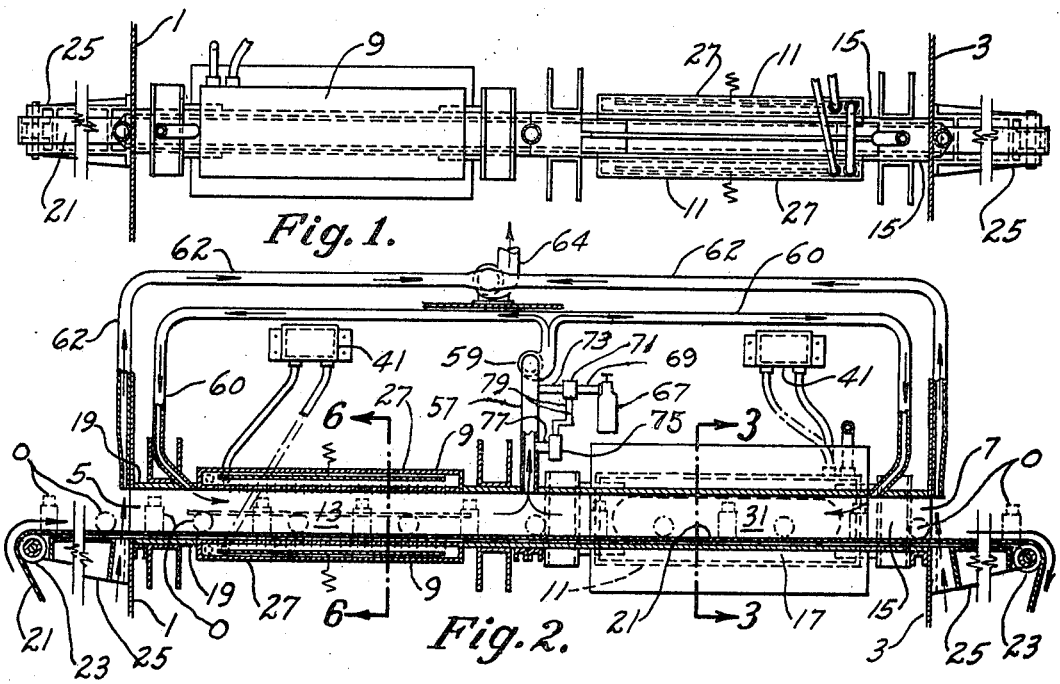
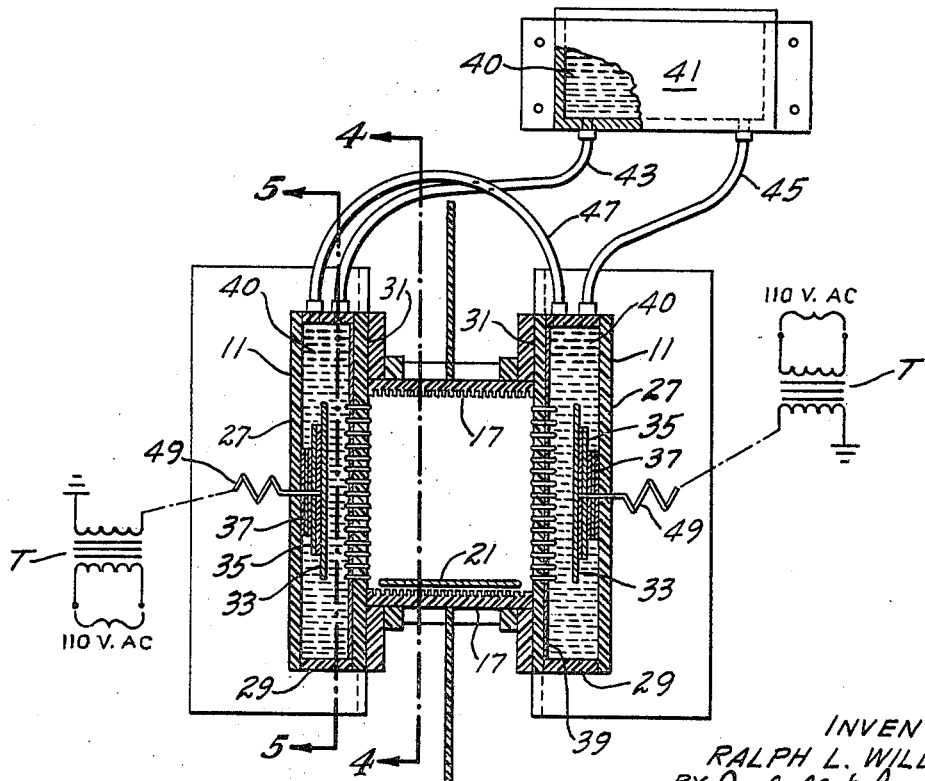
INVENTOR
RALPH L. WILLIAMS
BY Bedell & Burgess
ATTORNEYS

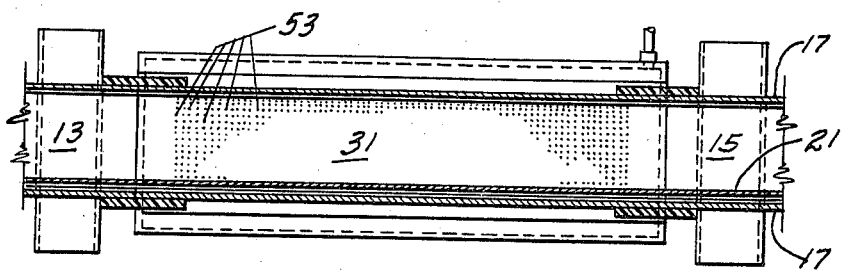
Fig. 4
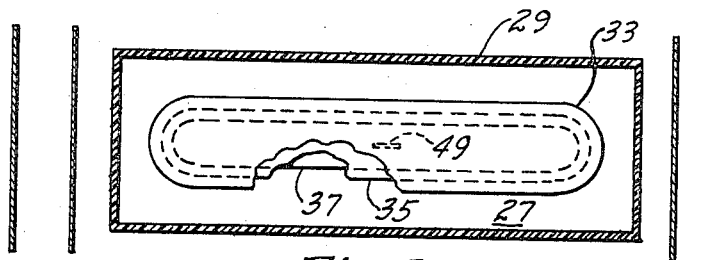
Fig. 5
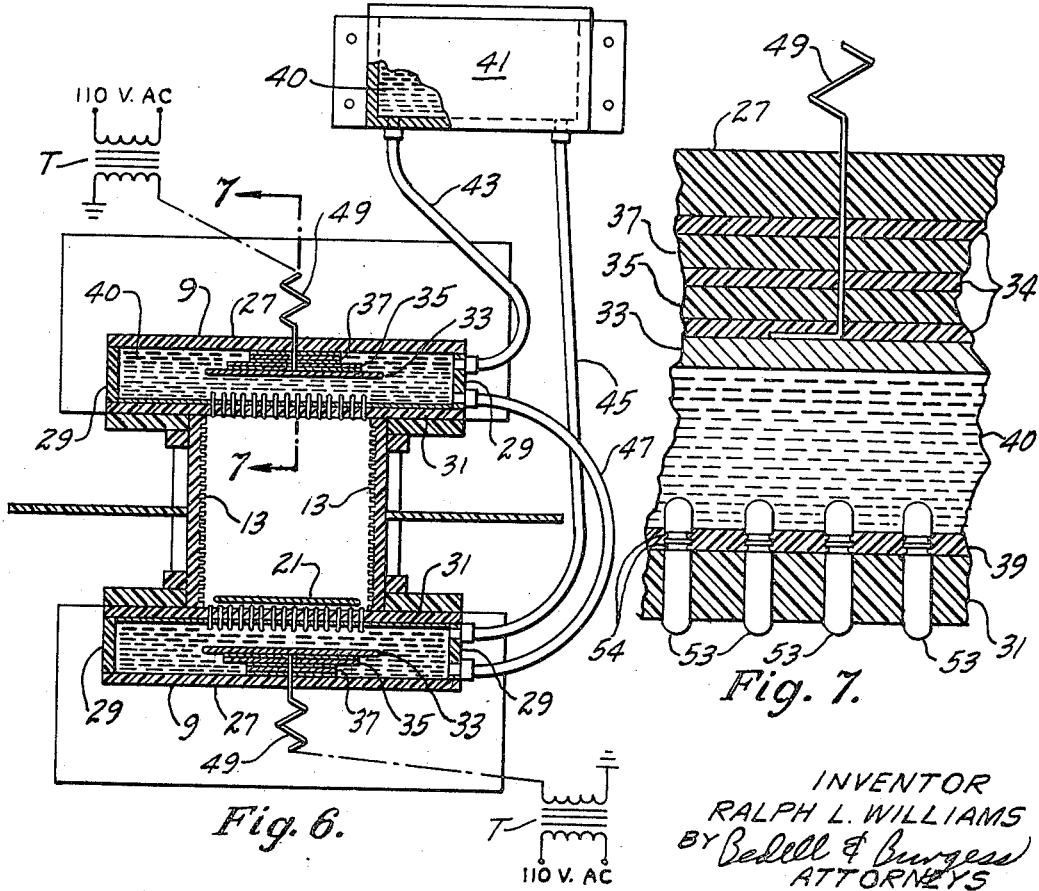
Fig. 6
Fig. 7
INVENTOR
RALPH L. WILLIAMS
BY Bedell & Burgess
ATTORNEYS United States Patent Office 3,484,363
Patented Dec. 16, 1969

3,484,363
ELECTRICAL DISCHARGE TREATING APPARATUS DESIGNED TO PROVIDE A PLURALITY OF UNIFORM SPARK DISCHARGES
Ralph L. Williams, Maplewood, Mo. (% Lectro Engineering Company, 3845 Penrose, St. Louis, Mo. 63107)
Filed Nov. 14, 1966, Ser. No. 594,102
Int. Cl. B44d 5/04; H01t 3/00, 13/20
U.S. Cl. 204—312                           15 Claims

ABSTRACT OF THE DISCLOSURE

Electrical discharge apparatus for treating materials, having a pair of improved electrodes spaced apart from each other and each comprising a face plate of dielectric material, a closely spaced group of discrete conductors of small cross-sectional area extending through the dielectric plate substantially throughout its area, a plate of conductive material spaced rearwardly from the dielectric plate annd parallel thereto, and a gaseous dielectric medium in the space between the plates, the conductive plates of both electrodes being connected to a source of electric energy. Means is provided for excluding external air from the treating space between the electrodes and for circulating the contained ozone atmosphere and for adding inert gases to the contained atmosphere.

---

The invention relates to electrical discharge apparatus and method for treating materials.

For the treatment of polyethylene bodies to improve the adherency of their surfaces for inks and adhesives, spaced apart plate electrodes each shielded with a plate of dielectric material such as polyethylene have been used to provide a diffused electrical discharge across the treating gap separating them, the discharge taking place between the polyethylene plates. Because of the high voltages required to provide such discharges across sufficiently large gaps to accommodate large bodies such as polyethylene bottles, the electrical stresses in the dielectric plates, or shields, are very high, and ultimately cause the plates to fail.

It is accordingly a main object of the invention to provide electrical discharge material treating apparatus having an improved electrode structure capable of providing a generally similar discharge, but having longer life and being less subject to failure than present electrodes.

It is a further object to provide electrical discharge apparatus and method for treating materials faster, more effectively, and with lower voltages than was formerly possible.

It is an additional object to provide a method for treating the inner, as well as the outer, surfaces of hollow polyethylene and other polymer bodies.

The foregoing and additional more detailed objects and advantages of the invention are achieved by the construction described hereinafter and illustrated in the accompanying drawings, in which:

FIGS. 1 and 2, respectively, are transverse horizontal and vertical sectional views through the treating chamber portion of a machine embodying my invention.

FIG. 3 is a transverse vertical sectional view along 3—3 of FIG. 2.

FIG. 4 is a longitudinal vertical sectional view of the treating chamber illustrated in FIG. 3, taken along line 4—4 of FIG. 3.

FIG. 5 is a longtiudinal vertical sectional view along one of the vertical electrodes, taken along line 5—5 of FIG. 3.

FIG. 6 is a transverse vertical sectional view along line 6—6 of FIG. 2.

FIG. 7 is a longitudinal vertical sectional view, somewhat enlarged, along line 7—7 of FIG. 6.

As best seen in FIGS. 1 and 2, the treating apparatus is enclosed in a housing having end walls 1 and 3 formed respectively with aligned openings 5 and 7. Mounted within housing 1, 3 are a pair of vertically spaced, horizontally disposed electrode structures 9, 9, the space between them being horizontally aligned with openings 5 and 7 in the housing end walls, and horizontally spaced, vertically disposed electrode structures 11, 11, the horizontal space between them being similarly aligned with openings 5 and 7 in the housing end walls 1 and 3. Horizontal electrode structures 9, 9 are spaced apart vertically by horizontally spaced walls 13, 13 which are made of dielectric material and are aligned with the sides of opening 5 and end wall 1 and with an inner opposing face of electrode structures 11, 11 to form with the latter and with short similarly spaced similarly aligned vertical wall structures 15 aligned with the sides of opening 7 in end wall 3, the side walls of a tunnel connecting openings 5 and 7 in end walls 1 and 3. A pair of vertically spaced horizontal wall members 17, 17 aligned with the top and bottom margins of opening 7 in end wall 3 space vertical electrodes 11, 11 apart horizontally and extend from end wall 3 to the outer margin of electrode structures 9, 9 and similar vertically spaced horizontal wall structures 19, 19 extending from the outer margins of horizontal electrode structures 9, 9 to opening 5 in end wall 1, with the upper and lower edges of which they are vertically aligned to form, with electrodes 9, 9 the upper and lower walls of a tunnel connecting openings 5 and 7 in end walls 1 and 3.

The tunnel thus formed provides a treating chamber for plastic objects. For conveying the objects through the tunnel for treatment by the vertical and horizontal electrode structures 11 and 9 respectively, a power-driven belt 21 is supported from housing end walls 1 and 3 by rollers 23, 23 pivotally mounted on the ends of brackets 25, 25 extending from the housing end walls 1 and 3 immediately below openings 5 and 7 therein, belt 21 being slidably supported on the bottom wall of the tunnel formed by bottom horizontal wall 17, bottom horizontal electrode structure 9 and bottom horizontal wall 19.

The treatment consists of subjecting the bottles or other objects to a high intensity ozonolysis, electrical discharge, and short wave ultraviolet rays resulting therefrom, as they pass through the vertically disposed and horizontally disposed treating chambers in the tunnel connecting openings 5 and 7. I have found that the most effective means for creating a strong ozone atmosphere is the structure best shown in FIGS. 3, 6 and 7.

Electrodes 9 and 11 are identical except for their positioning and accordingly the same part numbers are used in describing both. Each consists of a shallow box having a flat rear wall 27 of dielectric material, a peripheral wall 29 of similar material and a front wall 31 also of dielectric material, preferably polyethylene. Supported from the rear wall 27 is an electrode 33 comprising an oblong flat metal plate spaced substantially equidistantly between rear wall 27, front wall 31 and peripheral wall 29, being supported from rear wall 27 by laminations of dielectric material 33 of substantially less area than the electrode. To provide an effective moisture seal as well as dielectric, the entire interior of the box thus formed is coated with a layer 39 of moisture-resistant dielectric material such as epoxy and glass. The boxes, or electrode structures, thus formed are filled with either a liquid or gaseous dielectric material 40. If liquid dielectric is used, a reservoir 41 connected to the electrode structures by suitable conduits 43, 45, 47 is provided to accommodate expansion of the fluid. Electrodes 33 are connected by suitable leads to transformers T (shown schematically), the secondary coils of which provide very high voltage in the order of 200,000 volts or greater to the electrodes 33.

In order to provide a dense plurality of spark discharges across the gaps between vertical electrode structures 11 and horizontal electrode structures 9, the forward faces 31 of each of these structures is uniformly perforated at close intervals, and through each of the perforations is fitted a metal pin 53, preferably aluminum, pins 53 being held in position by a pair of annular grooves 54 in their cylindrical surfaces which are embedded in the sealing coating 39 of epoxy and glass on the inner surface of polyethylene plate 31. With this arrangement, the high voltage current on electrode plates 33 is transmitted by capacitance to the inner ends of pins 53. The pins 53 of the opposite electrode faces function as the opposite sides of individual capacitors, the space between the opposing faces serving as the dielectric member of the same capacitors, causing a multiplicity of sparks to cross the gap between each pin and its opposite number in both directions, depending upon the direction at any instant of the alternating current supplied to the electrodes. With this arrangement, a very high intensity ozone atmosphere is created in the tunnel formed by the horizontal and vertical electrode structures 9 and 11 respectively, and the spark discharging between the aluminum pins create short wave ultraviolet rays, and since plates 31 are not subjected to high electrical stresses to which they would be subjected if pins 53 were not provided, they have a much longer life and are not subject to failure.

In order to eliminate a boundary layer or envelope of air or moisture on the surface and pockets therein of objects being treated by the apparatus and to maintain a uniformly high intensity ozone atmosphere about the treated articles, a constant circulation of ozone through the tunnel is provided and external air is excluded. This is accomplished by providing a vertical passage 57 at the center of the tunnel intermediate the vertical and horizontal treating chambers and connecting passage 57 with a suction pump 59, the outlet of which communicates by passages 60 with the end portions of the tunnel, so that ozone is constantly recirculated through the tunnel. To exclude external air and its usual moisture content, an air curtain is formed across each opening 5 and 7 by means of ducts 62 extending upwardly from the top margins of the openings and connected suction pump 64.

It is also possible to accelerate the treatment, increase its effectiveness to cross link the molecules of the polyethylene and/or reduce the voltage requirements by the introduction into the treating chamber of inert gases such as argon or the like, having a lower dielectric strength than air. This can be accomplished by connecting a source of the gas, such as cylinder 67, to conduit 57 by means of conduit 69, metering valve 71 and conduit 73, metering valve 71 being controlled by automatic density check device 75, connected by conduit 77 to conduit 57. Electrical conductors 79 operatively connect density check device 75 to metering valve 71, so that the volume of gas admitted by the metering valve to conduit 77 is at all times directly proportional to the gas density in the treating chambers between the electrode structures. It has also been found that the inside, as well as the outside, of hollow polyethylene objects may be treated by filling the objects with a gas having a lower dielectric strength than the gas within the treating chamber. For example, if air is being circulated through the treating chamber, the bottles may be filled with argon. Conversely, if the containers are filled with air, a gas composition of higher dielectric strength than air, e.g., sulphur hexafluoride or Freon must be circulated through the treating chamber.

Operation of the device is as follows: Transformers T are energized and plastic objects O which are to be treated are placed on the intake end of belt 21 adjacent opening 5. After the objects pass the air curtain to enter the tunnel, they are bathed in the stream of circulating ozone by which air and moisture envelopes and pockets are removed from their surfaces. As the objects pass through the space between horizontal electrode structures 9, 9 they are bombarded by the proliferation of vertical sparks passing between pins 53 on the upper and lower electrode structures, the passage of the sparks also providing a high concentration of ozone and short wave ultraviolet rays in the treatment chamber. As the objects continue to pass through the tunnel on belt 21 they pass between vertical electrode structures 11, 11 between which sparks pass horizontally between pins 53 in the oppositely disposed electrode structure faces, thus being bombarded by these sparks and having their surfaces subjected to the resultant high concentration of ozone and ultraviolet rays generated in this region by these discharges. Meanwhile the rapid circulation of ozone effected in the tunnel by suction pump 59 would have continued to remove any boundary layer of air or moisture from the surfaces of the treated objects so that they might be subjected directly to the ozonolysis and contact with the sparks and thus have their surfaces sufficiently oxidized to make them adherent to printing inks and adhesives.

The details of the apparatus and method disclosed herein may be modified substantially without departing from the spirit of the invention and the exclusive use of any modifications as come within the scope of the appended claims is contemplated.

What is claimed is:

1. Electrical discharge apparatus comprising spaced apart elements defining between them a reaction zone, at least one of said elements being an electrode having a face plate of dielectric material, a plurality of closely spaced conductors of relatively small area individually extending through said face plate substantially throughout the area thereof and terminating substantially in a common plane with each other, said conductors being electrically insulated from each other by said dielectric material of said face plate, a plate of conductive material spaced rearwardly from said face plate and said conductors and disposed in parallel relation thereto, means connected to said conductive plate for connection to an electric power source, means defining a fluidtight chamber including said plates, and a fluid dielectric medium between said conductive plate and said face plate.

2. Apparatus according to claim 1 in which said dielectric plate forms the front wall of a closed box-like element, the rear wall and peripheral wall of said box-like element being also formed of dielectric material, said conductive plate being supported from said rear wall substantially intermediate said rear and front walls, and fluid dielectric material filling said box-like element.

3. Apparatus according to claim 2 wherein said dielectric plate is provided with a group of closely and uniformly spaced perforations, said small area conductors being positioned in said perforations.

4. Apparatus according to claim 3 wherein said small area conductors are cylindrical elements with their ends projecting inwardly and outwardly from said dielectric plate.

5. Apparatus according to claim 4 wherein the cylindrical surfaces of said members are grooved inwardly of said dielectric plate and a coating of moisture-resistant dielectric material is formed on the inner surface of said plate and embedded in said grooves of said conductive elements.

6. Apparatus according to claim 5 in which there are a pair of said electrode elements horizontally disposed and in vertically spaced relation with each other and a second pair of said electrode elements vertically disposed and in horizontally spaced relation with each other, the spaces between said vertically disposed and horizontally disposed electrode elements being aligned with each other.

7. Apparatus according to claim 6 wherein wall structure including said dielectric plates forms a tunnel enclosing the aligned spaces between said vertically and horizontally disposed electrodes.

8. Apparatus according to claim 7 including means for excluding external air from said tunnel.

9. Apparatus according to claim 8 including means for rapidly circulating an ozone atmosphere through said tunnel.

10. Apparatus according to claim 9 in which said last named means comprises suction producing means connected to said tunnel intermediate its ends whereby to draw the ozone atmosphere from the tunnel and reintroduce it to the tunnel adjacent the ends thereof.

11. Apparatus according to claim 10 including means for adding measured quantities of inert gases to the atmosphere within the tunnel.

12. Apparatus according to claim 11 in which said means comprises a source of inert gas, conduit means connecting said source to said circulating means, and metering valve means in said last named conduit.

13. Apparatus according to claim 12, including means for measuring the atmospheric density within said circulating means anterior to said last-named conduit, and means operatively connecting said density measuring means to said measuring means for causing the latter to meter gas into said circulating means in direct proportion to the atmospheric density within said tunnel.

14. Apparatus according to claim 9 in which there is a movable belt extending through said tunnel and adapted to carry plastic objects for treatment through said treating chambers.

15. Apparatus according to claim 10 including reservoirs communicating with said box-like structures, said reservoirs forming expansion chambers for said fluid dielectric.

References Cited

UNITED STATES PATENTS

| | | | |
|---|---|---|---|
| 2,195,431 | 4/1940 | Shively et al. | 204—312 |
| 2,583,899 | 1/1952 | Smith | 204—312 |
| 3,074,870 | 1/1963 | Carswell et al. | 204—312 |

ROBERT K. MIHALEK, Primary Examiner

U.S. Cl. X.R.

204—168; 313—309